(12) United States Patent
Kim et al.

(10) Patent No.: US 6,943,853 B2
(45) Date of Patent: Sep. 13, 2005

(54) LIQUID CRYSTAL DISPLAY

(75) Inventors: Jeom Jae Kim, Seoul (KR); Tae Woon Ko, Kyongsangbuk-do (KR)

(73) Assignee: LG.Philips LCD Co., Ltd,, Seoul (KR)

( * ) Notice: Subject to any disclaimer, the term of this patent is extended or adjusted under 35 U.S.C. 154(b) by 260 days.

(21) Appl. No.: 10/026,478

(22) Filed: Dec. 27, 2001

(65) Prior Publication Data

US 2002/0085141 A1 Jul. 4, 2002

(30) Foreign Application Priority Data

Dec. 28, 2000 (KR) ........................................ 2000-84091

(51) Int. Cl.[7] ............................................. G02F 1/1343
(52) U.S. Cl. ........................ 349/43; 349/139; 349/140; 349/149; 349/152; 349/40; 349/150; 349/151; 257/48; 257/59; 257/72; 257/350
(58) Field of Search ........................... 349/43, 40, 139, 349/140, 143, 152, 156, 151, 141, 123, 177, 147, 187, 54, 192; 207/48, 59, 72, 350

(56) References Cited

U.S. PATENT DOCUMENTS

| | | | | | |
|---|---|---|---|---|---|
| 5,157,476 A | * | 10/1992 | Yoshida | .................... | 357/70 |
| 5,457,381 A | * | 10/1995 | Farwell | .................... | 324/158.1 |
| 5,530,568 A | * | 6/1996 | Yamamoto et al. | ............ | 359/54 |
| 5,657,139 A | * | 8/1997 | Hayashi | .................... | 349/40 |
| 5,742,173 A | * | 4/1998 | Nakagomi et al. | .......... | 324/753 |
| 6,028,442 A | * | 2/2000 | Lee et al. | .................... | 324/770 |
| 6,246,074 B1 | * | 6/2001 | Kim et al. | .................... | 257/48 |
| 6,255,130 B1 | * | 7/2001 | Kim | .................... | 438/30 |
| 6,335,211 B1 | * | 1/2002 | Lee | .................... | 438/22 |
| 6,524,876 B1 | * | 2/2003 | Baek et al. | .................... | 438/48 |
| 6,530,068 B1 | * | 3/2003 | Cao et al. | .................... | 716/8 |

* cited by examiner

*Primary Examiner*—Nathan J. Flynn
*Assistant Examiner*—Fazli Erdem
(74) *Attorney, Agent, or Firm*—McKenna Long & Aldridge LLP

(57) ABSTRACT

A liquid crystal display (LCD) including a first substrate and a second substrate. A plurality of gate lines and data lines are formed on the first substrate perpendicular to each other to define a plurality of pixel regions. A thin film transistor is formed for every one pixel. A common electrode is formed on the second substrate. A gate pad, a data pad, and a common electrode pad electrically are connected to each of the gate lines, data lines, and common electrodes respectively. A data on/off pad is formed between adjacent data pads in substantially the same pattern as the data pad for testing a data signal applied to the pixel region. A gate on/off pad is formed between adjacent gate pads in substantially the same pattern as the gate pad for testing a gate signal applied to the pixel region. A common electrode on/off pad is provided for testing a common electrode signal applied to the pixel region. The LCD thereby prevents damage from a rubbing cloth caused by the spacing between the on/off pads, to improve a picture quality.

29 Claims, 4 Drawing Sheets

LIQUID CRYSTAL DISPLAY

This application claims the benefit of Korean Patent Application No. 2000-84091 filed on Dec. 28, 2000, which is hereby incorporated by reference for all purposes as if fully set forth herein

BACKGROUND OF THE INVENTION

1. Field of the Invention

The present invention relates to a liquid crystal display (LCD), and more particularly, to an LCD which is not affected by a rubbing cloth used to form a uniform orientation film.

2. Discussion of the Related Art

FIG. 1 illustrates a plan view of a related art LCD, FIG. 2 illustrates an enlarged view of part "A" in FIG. 1, and FIG. 3 illustrates a section of part "B" in FIG. 1, showing sections of pads.

Referring to FIG. 1, the related art LCD 10 is provided with an upper substrate 200 having a pixel region A/A defined thereon bonded with a lower substrate 100 by a sealing material, and liquid crystal (not shown) sealed between the substrates, As shown in FIG. 2, there are a plurality of pads for contacting a Tape Carrier Package (TCP) at edges of the lower substrate 100, i.e., data pads (DP), gate pads (GP), and data on/off pads (DOP, DOFP) and gate on/off pads (GOP, GOFP) for testing independent patterns between the common electrode, data and gate pads. There is a static electricity preventing circuit (not shown) formed at portions excluding the pixel region A/A on the upper substrate 100. Though not shown, there is a common electrode formed either on the upper substrate 200 or the lower substrate 100. In operation, the common electrode has a field applied thereto together with a transparent pixel electrode (or data electrode, not shown) formed in a pixel region of the lower substrate 100 to change an orientation of the liquid crystal layer. There are also common electrode pads and common electrodes on/off pads.

Referring to FIG. 2, all of the common electrode, data and gate pads and the on/off pads are connected at an outer side of the panel in an "L" line for applying a signal to the pixel region at the same time, and then the panel is tested. Upon completion of the test, the "L" line is removed.

Referring to FIG. 3, a gate line 101 is formed on the lower substrate 100 of a material such as glass. A gate insulating film 102 is formed on the lower substrate 100 including the gate line 101. The gate insulating film 102 is etched until a region of the gate line 101 is exposed. The pads GP, GOP, and GOFP are formed on the etched regions.

Before the upper substrate 200 and the lower substrate 100 are bonded, an orientation film (not shown) is formed on the lower substrate for orientation of the liquid crystal after a Thin Film Transistor (TFT) array is formed for driving the pixel region A/A. The orientation film is rubbed with a rubbing cloth 300 for forming fixed grooves.

However, referring to FIG. 3, because there are gate on/off pads (GOP/GOFP) between every gate pad GP, the rubbing cloth 300 passes upper parts of the gate on/off pads (GOP/GOFP) initially in the rubbing process in the fabrication of the liquid crystal cell. The rubbing cloth 300 may be damaged by the spacing between the gate on/off pads (GOP/GOFP) and the environment. Particularly, once the rubbing cloth 300 is damaged from the spacing at both ends of the gate on/off pads (GOP/GOFP), the damaged rubbing cloth 300 forms scratches in the pixel region A/A when the rubbing cloth 300 passes through the pixel region A/A, which causes blurs to be displayed when the LCD is operated.

SUMMARY OF THE INVENTION

Accordingly, the present invention is directed to a liquid crystal display that substantially obviates one or more of the problems due to limitations and disadvantages of the related art.

An advantage of the present invention is to provide an LCD, in which damage from a rubbing cloth caused by the spacing between on/off pads is prevented thus improving the picture quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display includes a first substrate and a second substrate; a plurality of gate lines and data lines formed on the first substrate perpendicular to each other to define a plurality of pixel regions; a thin film transistor formed for every one pixel; a common electrode on the second substrate; a gate pad, a data pad, and a common electrode pad electrically connected to each of the gate lines data lines, and common electrodes respectively; a data on/off pad formed between adjacent data pads in substantially the same pattern as the data pad for testing a data signal applied to the pixel region; a gate on/off pad formed between adjacent gate pads in substantially the same pattern as the gate pad for testing a gate signal applied to the pixel region; and a common electrode on/off pad for testing a common electrode signal applied to the pixel region.

In another aspect of the present invention, there is provided an LCD including a first substrate and a second substrate; gate lines and common lines formed on the first substrate; data lines formed perpendicular to gate lines to define a plurality of pixel regions; a thin film transistor formed for every one pixel; a common electrode and a data electrode formed in parallel for generating an in-plane field between the common electrode and the data electrode; a gate pad, a data pad, and a common electrode pad electrically connected to each of the gate lines, data lines, and common lines respectively, a data on/off pad formed between adjacent data pads in substantially the same pattern as the data pad for testing a data signal applied to the pixel region; a gate on/off pad formed between adjacent gate pads in substantially the same pattern as the gate pad for testing a gate signal applied to the pixel region; and a common electrode on/off pad formed between adjacent common electrode pads for testing a common electrode signal applied to the pixel region.

A pitch between the data pad and the data on/off pad may be substantially identical to the pitch between the data pads.

The gate on/off pad has a pattern substantially identical to the pattern of the gate pad, and a pitch between the gate pad and the gate on/off pad is substantially identical to the pitch between the gate pads.

The common electrode on/off pad has a pattern substantially identical to the pattern of the common electrode pad, and a pitch between the common electrode pad and the common electrode on/off pad is substantially identical to the pitch between the common electrode pads.

The thin film transistor includes a gate electrode formed at the same time as the gate line, a gate insulating film formed on an entire surface of the substrate including the gate electrode, a semiconductor layer formed on the gate insulating film, an ohmic contact layer formed on the semiconductor layer, and source and drain electrodes formed on the ohmic contact layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the LCD and the in-plane switching mode LCD of an embodiment of the present invention, examples of which are illustrated in the accompanying drawings.

Figure 4:
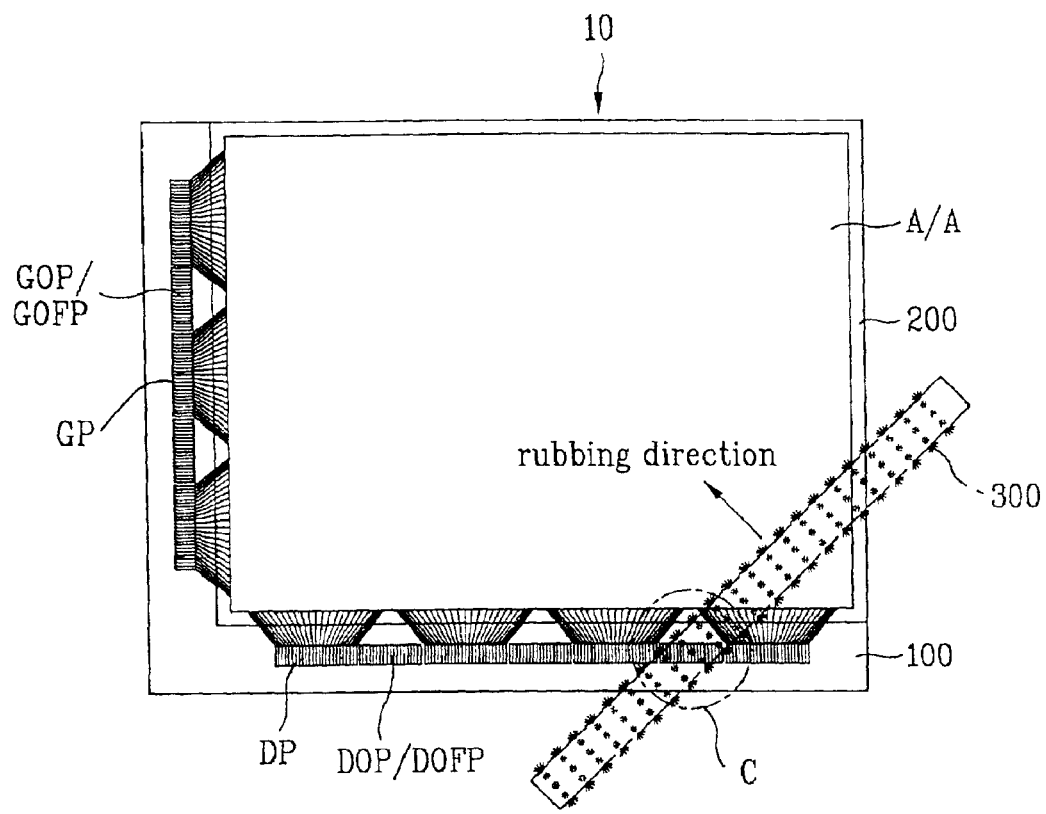
FIG. 4 illustrates a plan view of an LCD in accordance with an embodiment of the present invention.
Figure 5:
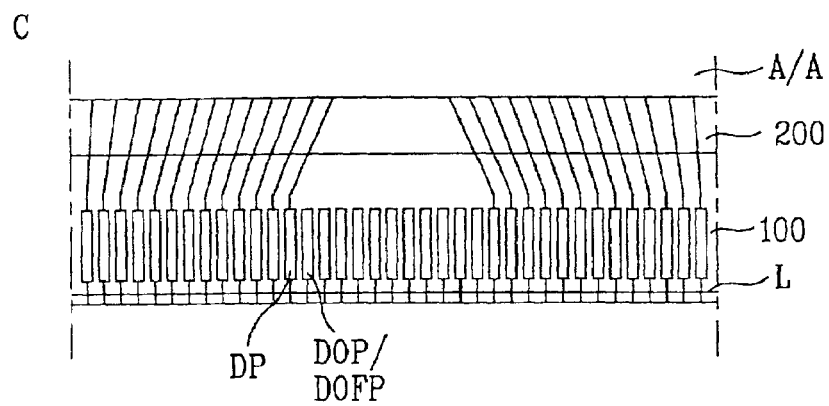
FIG. 5 illustrates an enlarged view of part "C" in FIG. 4.
Figure 6A:
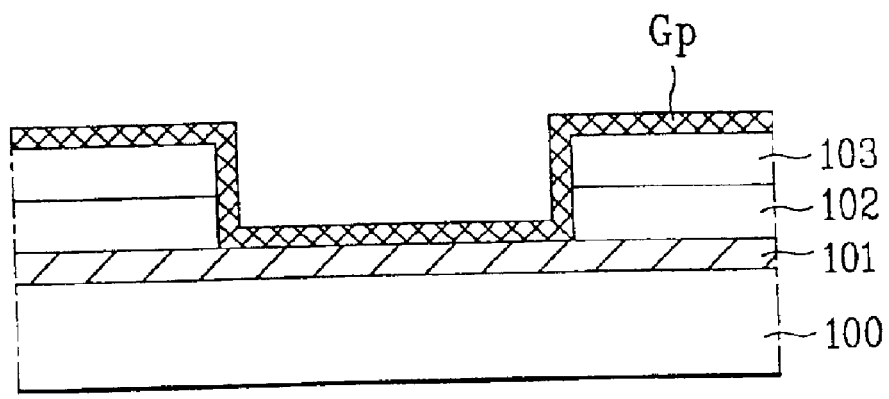
FIGS. 6A and 6B illustrate sections of a gate pad part and a data pad part in FIG. 4, respectively.
Figure 6B:
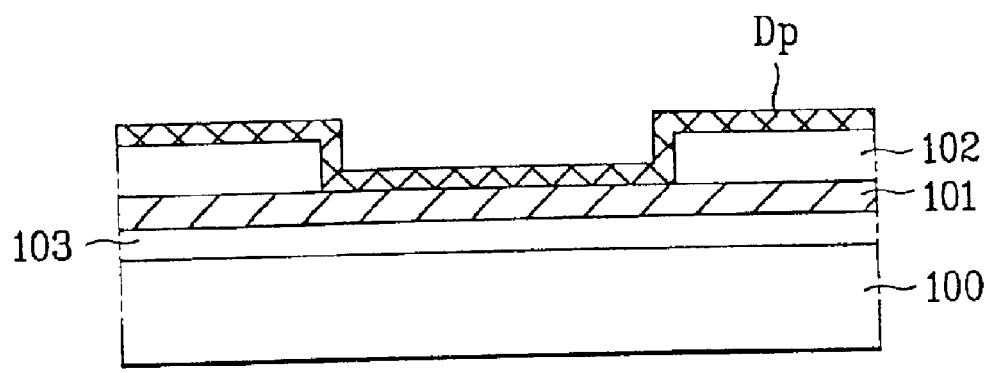

FIG. 4 illustrates a plan view of an LCD in accordance with an embodiment of the present invention, FIG. 5 illustrates an enlarged view of part "C" in FIG. 4, and FIGS. 6A and 6B illustrate sections of the gate pad part and the data pad part in FIG. 4, respectively.

Referring to FIG. 4, the LCD 10 in accordance with an embodiment of the present invention includes an upper substrate 200 having a pixel region A/A defined thereon bonded with a lower substrate 100 by a sealing material, and liquid crystal (not shown) sealed between the substrates. There are a plurality of pads for contacting a TCP at edges of the lower substrate 100, i.e., data pads DP, gate pads GP, and testing data on/off pads DOP/DOFP and testing gate on/off pads GOP/GOFP between the data pads DP and the gate pads GP respectively formed such that at least one of the testing data on/off pads DOP/DOFP and the testing gate on/off pads GOP/GOFP has substantially the same pattern with the data pads DP and gate pads GP, respectively. There is a static electricity protecting circuit (not shown) at parts excluding the pixel region (A/A) on the upper substrate 200. Though not shown, there is a common electrode formed either on the upper substrate 200 or the lower substrate 100 for having a field applied thereto together with a transparent pixel electrode (or data electrode, not shown) formed in a pixel region of the lower substrate 100, to change an orientation of the liquid crystal layer, common electrode pads, and common electrodes on/off pads.

The common electrode on/off pad may also be formed in substantially the same pattern as the common electrode pad.

The sections of pads will now be described in more detail with reference to FIG. 5. All the on/off pads may be formed substantially identical to the common electrode, data and gate pads, with a pitch between the data pads DP and the on/off pads (DOP and DOFP) formed substantially identical to a pitch between the gate pads. Moreover, though not shown, a pitch between the gate pad GP and the gate on/off pad GOP and GOFP may be formed substantially identical to the pitch between the gate pads, and the pitch between the common electrode pad and the common electrode on/off pad may be formed substantially identical to the pitch between the common electrode pads. The gate on/off pad GOP/GOFP, the data on/off pad DOP/DOFP, and the common electrode on/off pad may be form of a transparent conductive material, such as indium tin oxide (ITO).

Figure 1:
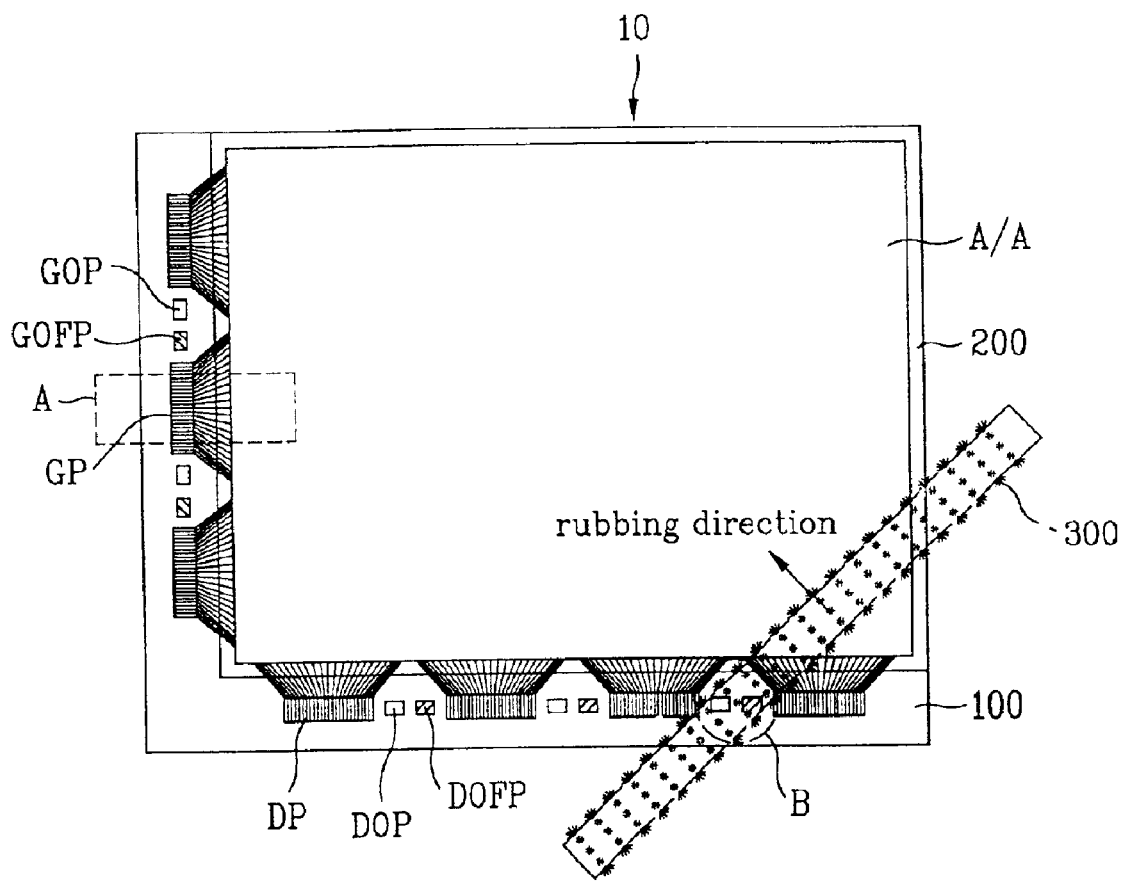
FIG. 1 illustrates a plan view of a related art LCD.
Figure 2:
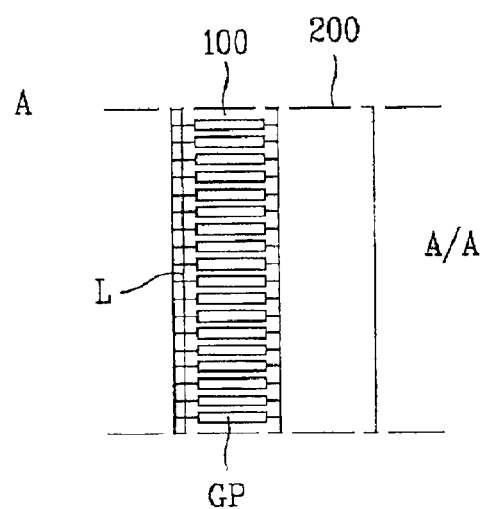
FIG. 2 illustrates an enlarged view of part "A" in FIG. 1.
Figure 3:
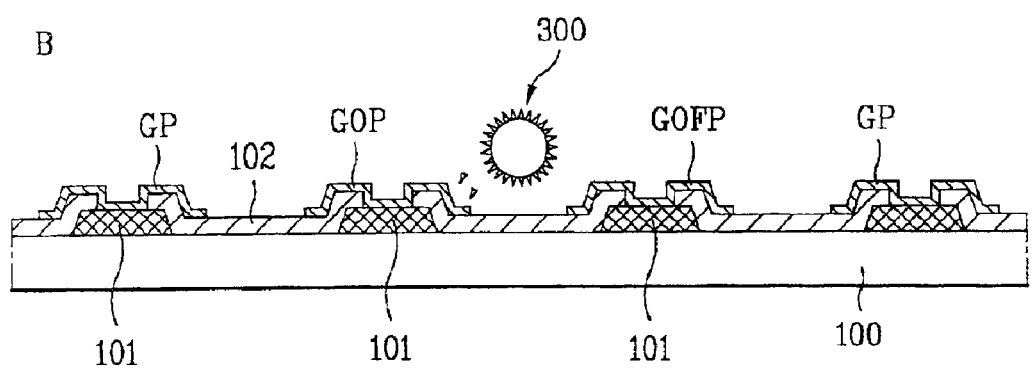
FIG. 3 illustrates a section of part "B" in FIG. 1.

Referring to FIG. 2, all the common electrode, data and gate pads and the on/off pads are connected at an outer circumference of the panel in an "L" line for applying a signal to the panel, i.e., to the pixel region at the same time, for testing the panel. Upon completion of the testing, the "L" line is removed. A data line connected to an even numbered pad may be connected to an even numbered on/off pad, and a data line connected to an odd numbered pad may be connected to an odd numbered on/off pad.

After a system of on/off pads is formed and, before the upper substrate 200 and the lower substrate 100 are bonded as shown in FIG. 4, an orientation film (not shown) is formed on the lower substrate for orientation of the liquid crystal after a TFT array process is carried out for driving the pixel region A/A, and the orientation film is rubbed with rubbing cloth 300 for forming fixed grooves.

Since an appropriate number of the on/off pads of the same form as the common electrode, data and gate pads are provided, and the on/off pads are formed to have an substantially identical spacing as the common electrode, data and gate pads, for minimizing the spacing between the common electrode, data and gate pads, damage to the rubbing cloth is minimized.

A TFT array process and an electrode pad forming process of the LCD 10 having the pixel region A/A and the pad region excluding the pixel region will be explained with reference to FIGS. 6A and 6B.

A gate line 101 of a metal is formed on a transparent substrate 100, and a gate insulating film 102 is formed on the gate line 101. In this instance, the gate line 101 is formed at the same time as a gate electrode in a pixel region A/A, and a gate insulating film 102 is also formed on an entire surface including the gate line and the gate electrode as one unit. Next, after a protection film 103 is formed on the gate insulating film 102, the gate insulating film 102 and the protection film 103 are etched, to open lines for connection with an external driving circuit. Gate pads GP of a transparent conductive film are formed to connect with the gate line 101 through the opened part, when the pixel electrode is formed in the pixel region. The data line 201 is formed on the gate insulating film 102 at a location of a thin film transistor in the pixel region, together the source and drain electrodes in the pixel region as one unit after a semiconductor layer and an ohmic contact layer are formed. Next, after the protection film 103 is stacked, the protection film 103 is etched as required to open the line. Then, a data pad DP is formed of a transparent material to be in contact with the data line 201 through the opened part, when the pixel electrode in the pixel region is formed at the same time. Though not shown, a gate on/off pad GOP/GOFP and a data on/off pad DOP/DOFP in substantially the same pattern as the gate pad GP and the data pad DP are formed, together with the gate pad GP and the data pad DP.

As has been explained, the LCD of the present invention has the following advantages.

Though rubbing on an LCD panel having on/off pads of independent patterns causes damage to the rubbing cloth from outer metal parts of the independent patterns which forms blurs on the panel, the change of the on/off pads of independent patterns into substantially identical forms as the electrode pads does not damage the rubbing cloth and prevents blurs on the panel, thereby improving the picture quality, for example, in the case of a current in-plane switching mode LCD or a twisted nematic (TN) LCD.

It will be apparent to those skilled in the art that various modifications and variations can be made in the LCD of the present invention without departing from the spirit or scope of the invention. Thus, it is intended that the present invention cover the modifications and variations of this invention provided they come within the scope of the appended claims and equivalents.

What is claimed is:

1. A liquid crystal display (LCD) comprising:

a first substrate and a second substrate;

a plurality of gate lines and data lines formed on the first substrate perpendicular to each other to define a plurality of pixel regions;

a thin film transistor formed for every one pixel;

a common electrode on the second substrate;

a gate pad, a data pad, and a common electrode pad electrically connected to each of the gate lines, data lines, and common electrodes, respectively;

a data on/off pad between adjacent data pads in substantially the same pattern as the data pad for testing a data signal applied to the pixel region;

a gate on/off pad between adjacent gate pads in substantially the same pattern as the gate pad for testing a gate signal applied to the pixel region; and, a common electrode on/off pad for testing a common electrode signal applied to the pixel region.

2. An LCD as claimed in claim 1, wherein a pitch between the data pad and the data on/off pad is substantially identical to the pitch between the data pads.

3. An LCD as claimed in claim 1, wherein the gate on/off pad has a pattern substantially identical to the pattern of the gate pad.

4. An LCD as claimed in claim 3, wherein a pitch between the gate pad and the gate on/off pad is substantially identical to the pitch between the gate pads.

5. An LCD as claimed in claim 1, wherein each of the gate on/off pad, the data on/off pad, and the common electrode on/off pad include a transparent conductive material.

6. An LCD as claimed in claim 5, wherein the transparent conductive material includes indium tin oxide.

7. An LCD as claimed in claim 1, wherein the thin film transistor includes:

a gate electrode connected with a gate line;

a gate insulating film on an entire surface of the substrate inclusive of the gate electrode;

a semiconductor layer on the gate insulating film;

an ohmic contact layer on the semiconductor layer; and source and drain electrodes on the ohmic contact layer.

8. A liquid crystal display (LCD) comprising:

a first substrate and a second substrate;

gate lines and common lines formed on the first substrate;

data lines formed perpendicular to gate lines to define a plurality of pixel regions;

a thin film transistor formed for every one pixel;

a common electrode and a data electrode in parallel, for generating an in-plane field between the common electrode and the data electrode;

a gate pad, a data pad, and a common electrode pad electrically connected to each of the gate lines, data lines, and common lines, respectively;

a data on/off pad between adjacent data pads in substantially the same pattern as the data pad;

a gate on/off pad between adjacent gate pads in substantially the same pattern as the gate pad; and, a common electrode on/off pad between adjacent common electrode pads for testing a common electrode signal applied to the pixel region.

9. An LCD as claimed in claim 8, wherein a pitch between the data pad and the data on/off pad is substantially identical to the pitch between the data pads.

10. An LCD as claimed in claim 8, wherein the gate on/off pad has a pattern substantially identical to the pattern of the gate pad.

11. An LCD as claimed in claim 10, wherein a pitch between the gate pad and the gate on/off pad is substantially identical to the pitch between the gate pads.

12. An LCD as claimed in claim 8, wherein the common electrode on/off pad has a pattern substantially identical to the pattern of the common electrode pad.

13. An LCD as claimed in claim 12, wherein a pitch between the common electrode pad and the common electrode on/off pad is substantially identical to the pitch between the common electrode pads.

14. An LCD as claimed in claim 8, wherein each of the gate on/off pad, the data on/off pad, and the common electrode on/off pad include a transparent conductive material.

15. An LCD as claimed in claim 14, wherein the transparent conductive material includes indium tin oxide.

16. An LCD as claimed in claim 8, wherein the thin film transistor includes;

a gate electrode connected with a gate line;

a gate insulating film on an entire surface of the substrate including the gate electrode;

a semiconductor layer on the gate insulating film;

an ohmic contact layer on the semiconductor layer; and source and drain electrodes on the ohmic contact layer.

17. A liquid crystal device (LCD) comprising:

an upper substrate having a pixel region defined thereon;

a lower substrate bonded with the upper substrate by a sealing material and having a plurality of pads provided at edges of the lower substrate, the plurality of pads including data pads, gate pads, testing data on/off pads and testing gate on off/pads;

wherein at least one of the testing data on/off pads and the testing gate on/off pads has substantially the same pattern as the data pads and the gate pads, respectively;

wherein at least one testing data on/off ad is between adjacent data on/off pads;

wherein at least one testing gate on/off pad is between adjacent sate on/off pads; and a liquid crystal provided between the substrates.

18. An LCD as claimed in claim 17, wherein a pitch between the data pad and the data on/off pad is substantially identical to the pitch between the data pads.

19. An LCD as claimed in claim 17, wherein the gate on/off pad has a pattern substantially identical to the pattern of the gate pad.

20. An LCD as claimed in claim 17, wherein a pitch between the gate pad and the gate on/off pad is substantially identical to the pitch between the gate pads.

21. An LCD as claimed in claim 17, wherein each of the gate on/off pad and the data on/off pad include a transparent conductive material.

22. An LCD as claimed in claim 21, wherein the transparent conductive material includes indium tin oxide.

23. An LCD as claimed in claim 17, wherein all of the common electrode, data and gate pads and the on/off pads are connected at an outer circumference of the LCD in an L line for applying a signal to the pixel region at substantially the same time.

24. An LCD as claimed in claim 17, wherein a data line is connected to an even numbered pad and an even numbered on/off pad.

25. An LCD as claimed in claim 17, wherein a data line is connected to an odd numbered pad and an odd numbered on/off pad.

26. An LCD as claimed in claim 17, further comprising an orientation film provided on the lower substrate.

27. A method of manufacturing a liquid crystal device (LCD) comprising:

forming a gate line made of metal on a transparent substrate;

forming a gate electrode at the same time as the gate line;

forming a gate insulating film on the gate line;

forming a protection film on the gate insulating film;

etching the gate insulating film and the protection film to form first open parts;

forming gate pads made of a transparent conductive material to connect with the gate line through the first open parts;

forming a pixel electrode at the same time as the gate pads;

forming a data line on the gate insulating film;

forming source and drain electrodes at the same time as the data line;

etching the protection film to form second open parts;

forming data pads made of transparent conductive material to connect with the data line through the second open parts; and forming gate on/off pads and data on/off pads having substantially the same pattern as the gate pads and provided between gate pads.

28. The method as in claim 27, wherein the data line and source and drain electrodes are formed after a semiconductor layer and an ohmic contact layer are formed.

29. The method as in claim 27, wherein the orientation film is rubbed with a rubbing cloth to form grooves in the film.

* * * * *